United States Patent [19]
Chiang

[11] Patent Number: 5,254,927
[45] Date of Patent: Oct. 19, 1993

[54] BATTERY CHARGER WITH APPLIANCE PLUG SOCKET

[76] Inventor: Chin-Hsing Chiang, 5 Floor, No. 2, alley 3, Lane 49, Houkang 1st Street, Hsin chuang City, Taipei, Hsien, Taiwan

[21] Appl. No.: 828,275

[22] Filed: Jan. 30, 1992

[51] Int. Cl.⁵ .............................................. H02J 7/00
[52] U.S. Cl. ........................................ 320/2; 307/150
[58] Field of Search ................. 320/2, 3, 4, 5, 6, 7, 320/15, 16; 307/150; 361/331, 380, 392, 393, 394, 395; 206/328, 333

[56] References Cited

U.S. PATENT DOCUMENTS

| | | | |
|---|---|---|---|
| 2,991,376 | 7/1961 | Sherwood et al. | 307/156 |
| 3,919,615 | 11/1975 | Niecke | 320/2 |
| 3,963,972 | 6/1976 | Todd | 320/2 |
| 4,748,344 | 5/1988 | Sing | 320/2 X |

FOREIGN PATENT DOCUMENTS 2028022 2/1980 United Kingdom .

Primary Examiner—Kristine L. Peckman
Attorney, Agent, or Firm—Lowe, Price, LeBlanc & Becker

[57] ABSTRACT

A battery charger is described which includes a plastic housing having a top shell and a bottom shell with a charging circuit defined therein. The charging circuit is adapted to be connected to an external power supply for charging rechargeable batteries which are disposed within the housing. The housing further has a hole in which a socket is mounted for connecting with an appliance plug so that an appliance may also be powered through the socket and plug as the batteries are charging.

2 Claims, 5 Drawing Sheets

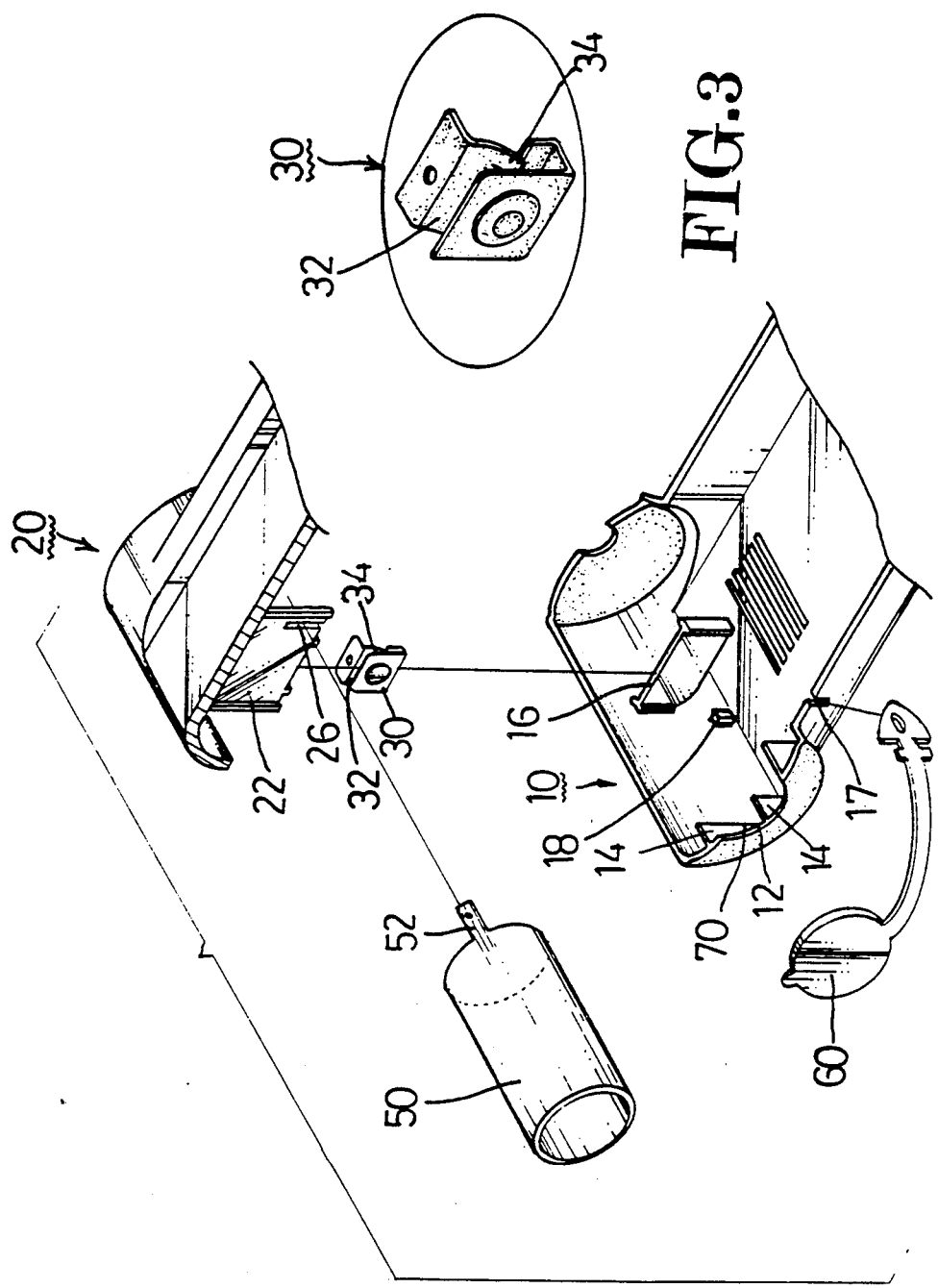

BATTERY CHARGER WITH APPLIANCE PLUG SOCKET

BACKGROUND OF THE INVENTION

The present invention relates to battery chargers and particularly relates to such a battery charger which has an appliance plug socket for connecting an electric appliance to a power supply while it is used in charging a rechargeable battery.

Regular portable electric or electronic appliances are general equipped with rechargeable batteries. When a rechargeable battery is at a low voltage level, it must be charged so that an electric or electronic appliance can be kept working properly. A battery charger is normally used to recharge the battery. There are several types of battery chargers used to charge rechargeable batteries. It generally takes 16-24 hours to fully charge a rechargeable battery when using a standard type battery charger. If a quick charging type battery charger is used, a rechargeable battery can be fully charged within 4-6 hours. When a rapid charging type battery charger is used, a rechargeable battery can be fully charged within 1-3 hours. When a battery charger is to be connected with the cigarette lighter socket on the instrument board of a vehicle to charge a rechargeable battery, any automotive electric appliance must be disconnected from the cigarette lighter socket. Because it takes a long time to charge the battery, the cigarette lighter socket will not be available for connection with any other electric or electronic appliance.

SUMMARY OF THE INVENTION

The present invention has been introduced to eliminate the aforesaid problem. Therefore, the main object of the present invention is to provide a battery charger that could afford a secondary power socket for connecting an electric appliance to a power supply when it is used in charging a rechargeable battery.

BRIEF DESCRIPTION OF THE DRAWINGS

FIG. 2 is a partly explored view thereof;

FIG. 3 is the perspective view of the copper plate 30;

DETAILED DESCRIPTION OF THE PREFERRED EMBODIMENTS

Figure 1:
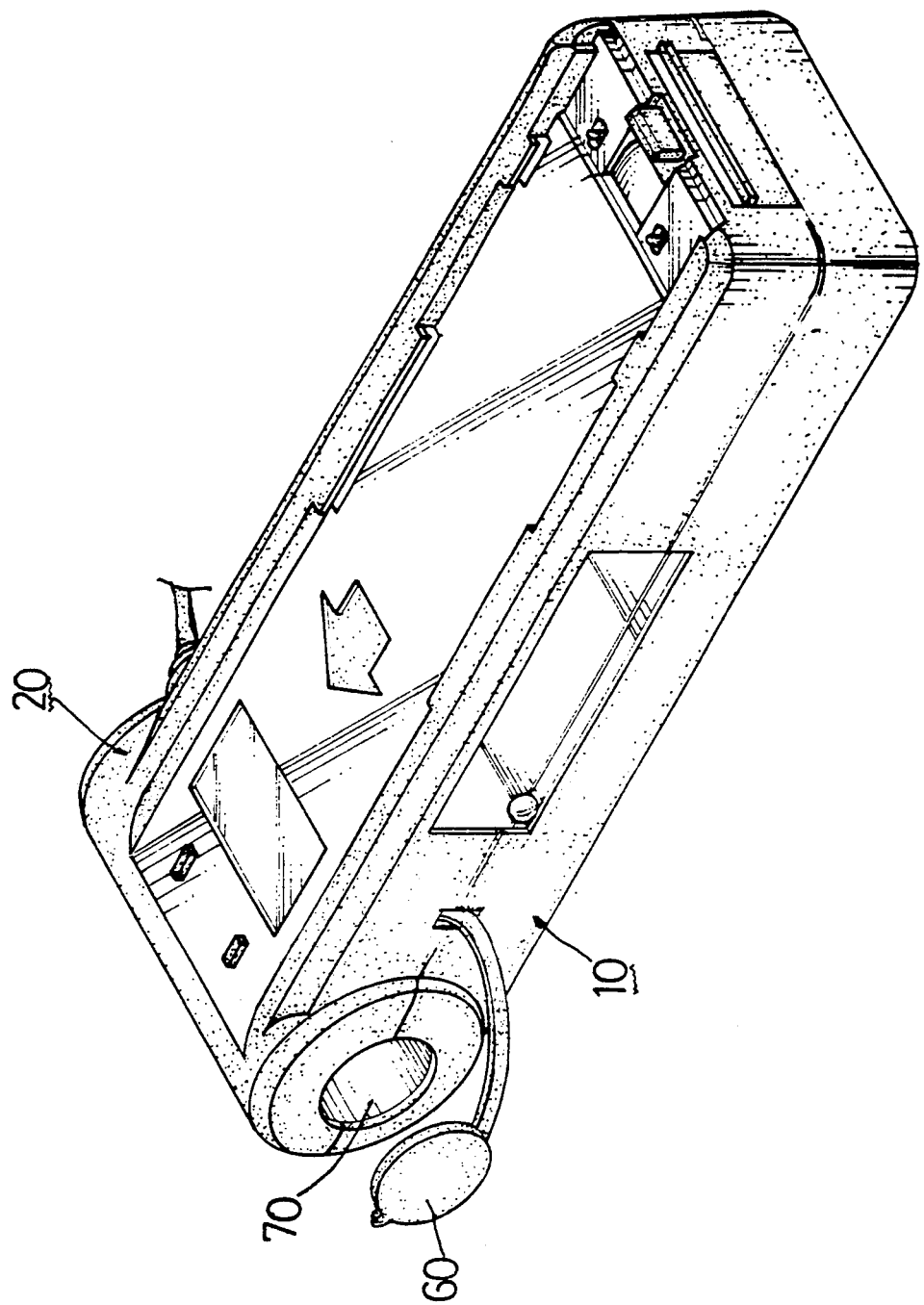
FIG. 1 is a perspective view of a battery charger embodying the present invention.
Figure 4:
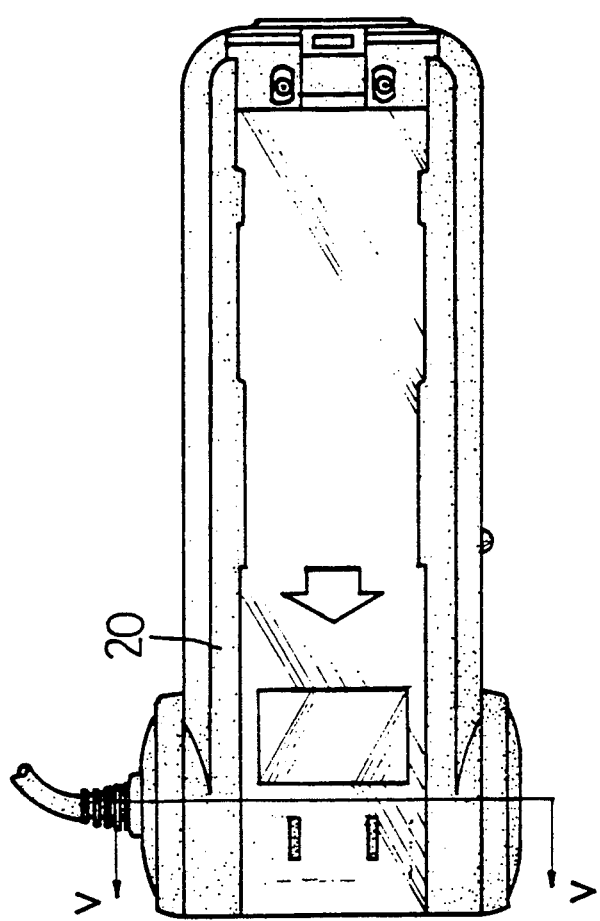
FIG. 4 is a top view of the battery charger of the present invention as shown in FIG. 1.
Figure 5:
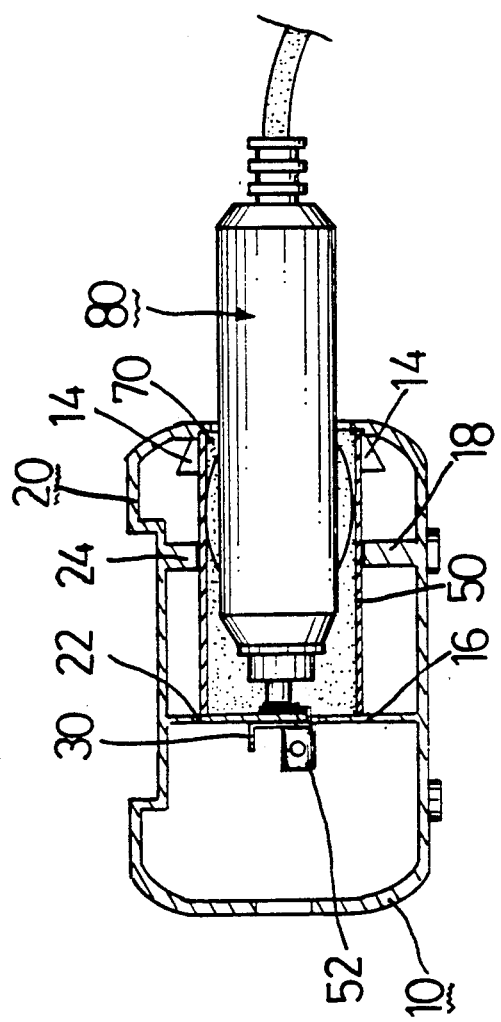
FIG. 5 is the cross sectional view taken on line V—V of FIG. 4.

Refering to FIGS. 1, 2 and 5, a battery charger is generally comprised of a bottom shell 10 covered with a top shell 20 with a cylindrical hole 70 defined therebetween at one end for holding a cylindrical socket 50. Of course, the battery charger has a charging circuit connected to a power supply for charging rechargeable batteries. Since the charging circuit is known in the art and not within the scope of the present invention, it will not be described further. The bottom shell 10 has a semi-circular hole 12 transversely disposed at one end, at least one inward projection 14 projecting from the inner wall surface thereof adjacent to the through hole 12, a unitary vertical supporting board 16 longitudinally disposed at one end, a cushion 18 at one end between the vertical supporting board 16 and the at least one inward projection 14, and a side notch 17 on the peripheral top edge thereof adjacent to the through hole 12. The top shell 20 is symmetrical to the bottom shell 10, having a hole, at least one inward projection and a side notch respectively corresponding to the hole 12, the at least one inward projection 14 and the side notch 17 on the bottom shell 10. The top shell 20 further comprises a vertical supporting board 22 and a cushion 24 corresponding to the vertical supporting board 16 and a cushion 18 on the bottom shell 10. The vertical supporting board 22 of the top shell 20 has a narrow hole 26. Once the top shell 20 is placed on the bottom shell 10, the vertical supporting boards 16, 22 are connected in a line to firmly retain a copper plate 30 therebetween. The copper plate 30, as showed in FIG. 3, is bent into a curved shape with a retaining groove 32 defined therein, having two unitary hooks 34 made through the process of punching and respectively projecting into the retaining groove 32. By inserting the vertical supporting board 22 of the top shell 20 into the retaining groove 32, the hooks 34 immediately hook in the outer wall of the vertical supporting board 22, and therefore, the copper plate 30 can be firmly retained between the vertical supporting boards 16, 22. As soon as the top shell 10 covers the bottom shell 20, the semi-circular holes 12 are incorporated into the cylindrical hole 70 for holding the cylindrical socket 50. The cylindrical socket 50 has a terminal 52 at one end inserted into the narrow hole 26 on the vertical supporting board 22 of the top shell 20. Once the cylindrical socket 50 is inserted into the cylindrical hole 70, it becomes firmly retained by the inward projections 14 and the cushions 18, 24 of the top and bottom shells 20, 10. After the assembly of the battery charger, the conductive terminal 52 of the cylindrical socket 50 and the copper plate 30 are respectively connected in parallel to the positive and negative terminals of a power supply. Further, there is provided an extra cap 60 secured to the side notches 17 on the top and bottom shells 10, 20 for closing the cylindrical hole 70.

Referring to FIG. 5 again, once an appliance plug 80 is inserted into the cylindrical hole 70, its two opposite terminals are respectively connected to the copper plate 30 and the terminal 52 of the cylindrical socket 50.

Figure 6:
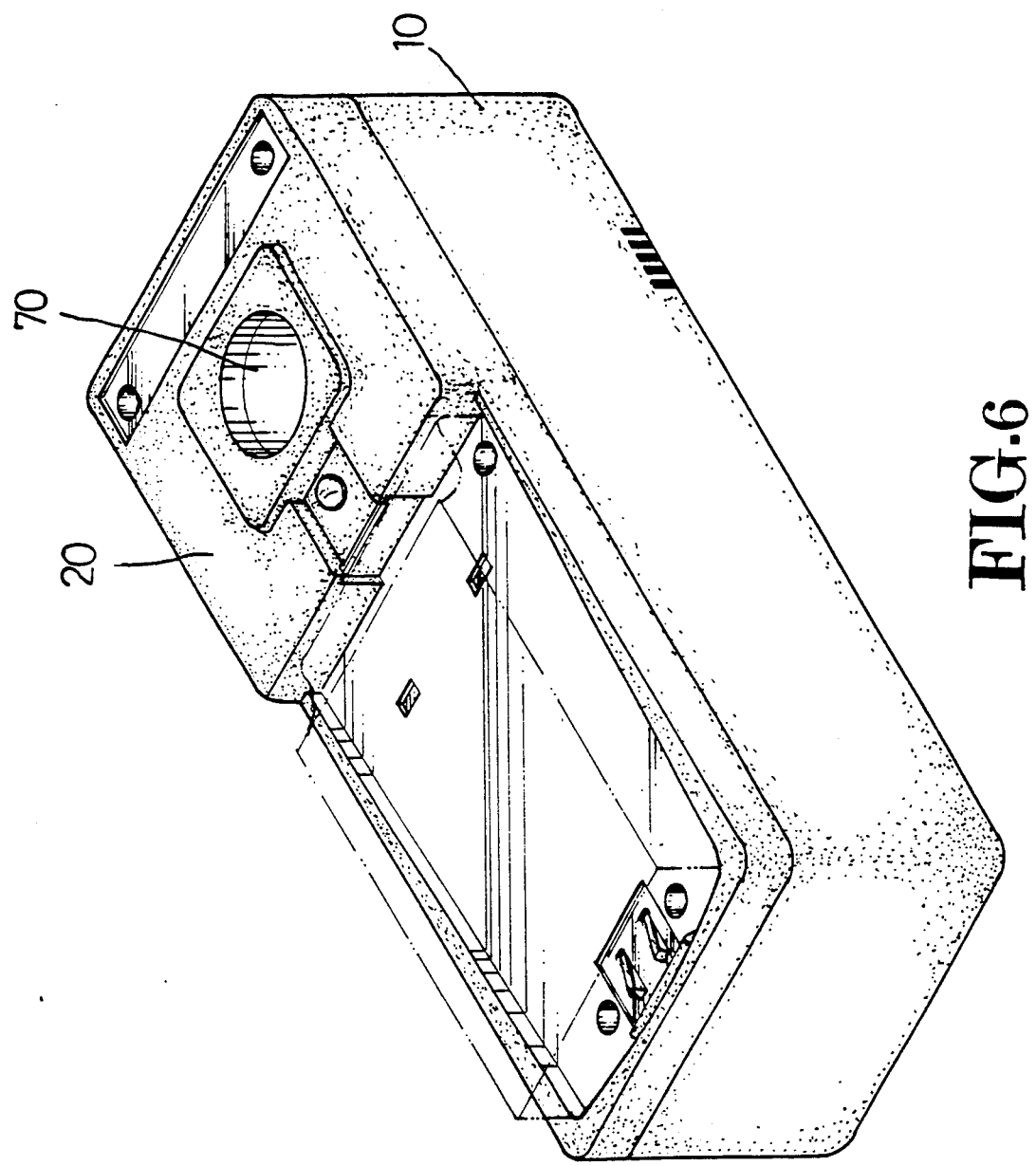
FIG. 6 is a perspective view of an alternate form of the present invention.

Referring to FIG. 6, therein illustrated is an alternate form of the present invention. In this embodiment, the cylindrical hole 70 (namely, the socket for an appliance plug) is disposed in a vertical position for top insertion of an appliance plug.

What I claim is:

1. A battery charger and appliance plug outlet combination comprising:

a plastic housing having a top shell and a bottom shell with a hinged inner connection at one end thereof, said housing containing batteries to be charged and a charging circuit, said circuit connected to an external power supply so that said batteries disposed therein may be charged by said external supply;

said top and bottom shells defining a circular hole opening into said housing at said one end thereof, the hole being formed by segments defined in opposed portions of said top and bottom shells;

a conductive cylindrical socket disposed with said housing having an opening abutting the hole at said one end, an open opposite end and a conductive terminal extending from said opposite end;

non-conductive retaining means disposed in the top and bottom shells surrounding said socket for retaining said socket in alignment with said hole when said shells are closed about the hinged connection and for closing the end of said socket adjacent said terminal, said conductive terminal extending from a side of said cylindrical socket through said retaining means;

a conductive pole mounted on the non-conductive retaining means axially aligned with said cylindrical socket at the end thereof closed by said retaining means, said terminal and pole coupled respectively to positive and negative terminals of said power supply whereby when an appliance plug jack is inserted through the hole in said housing into said socket, electrical connection will be made between the pole at the end of said socket and the conductive sides of said socket through the terminal on said socket with the power supply for recharging said batteries to also power said appliance through said jack form said power supply.

2. The housing of claim 1, further comprising a circular plug removably mounted on said housing for opening and closing the hole in said housing.

* * * * *